(12) United States Patent
Kölhi et al.

(10) Patent No.: US 8,270,417 B2
(45) Date of Patent: Sep. 18, 2012

(54) ACCESS NETWORK NODE AND METHOD FOR ACCESS NETWORK NODE

(75) Inventors: Johan Kölhi, Vaxholm (SE); Ayodele Damola, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 907 days.

(21) Appl. No.: 12/132,893

(22) Filed: Jun. 4, 2008

(65) Prior Publication Data
US 2009/0304009 A1  Dec. 10, 2009

(51) Int. Cl.
*H04L 12/26* (2006.01)
(52) U.S. Cl. .......... 370/401; 370/338; 370/396
(58) Field of Classification Search .......... 370/400, 370/352, 389, 396
See application file for complete search history.

(56) References Cited

U.S. PATENT DOCUMENTS

| | | | |
|---|---|---|---|
| 7,624,431 B2 * | 11/2009 | Cox et al. | 726/4 |
| 2005/0114491 A1 * | 5/2005 | Bushmitch et al. | 709/223 |
| 2007/0174443 A1 * | 7/2007 | Shaheen et al. | 709/223 |
| 2008/0254791 A1 * | 10/2008 | Oyama et al. | 455/435.1 |
| 2009/0141707 A1 * | 6/2009 | Kavanaugh | 370/352 |

FOREIGN PATENT DOCUMENTS
WO  WO2007/071461  *  6/2007

OTHER PUBLICATIONS
"Using IMS as a Service Framework" by Christopher Gourraud, 2007.*

* cited by examiner

*Primary Examiner* — Robert Wilson
*Assistant Examiner* — Pamit Kaur

(57) ABSTRACT

A method for an access network node, and the access network node, to provide a user device access to a service enabled by an IMS network, comprising the steps of:
setting up an IP tunnel for communication with the user device,
sending an authentication request to the user device via the tunnel,
receiving a response to the authentication request from the user device via the tunnel,
authenticating the user device,
sending a registration request comprising an IMPU associated with the user device to an IMS network node,
receiving a confirmation message from the IMS network node that the user device is authenticated,
sending an authorization confirmation message via the IP tunnel that the user device is authorized,
receiving a service request via the IP tunnel from the user device to start the service,
sending a service session initiation message to an application server associated with the service.

10 Claims, 9 Drawing Sheets

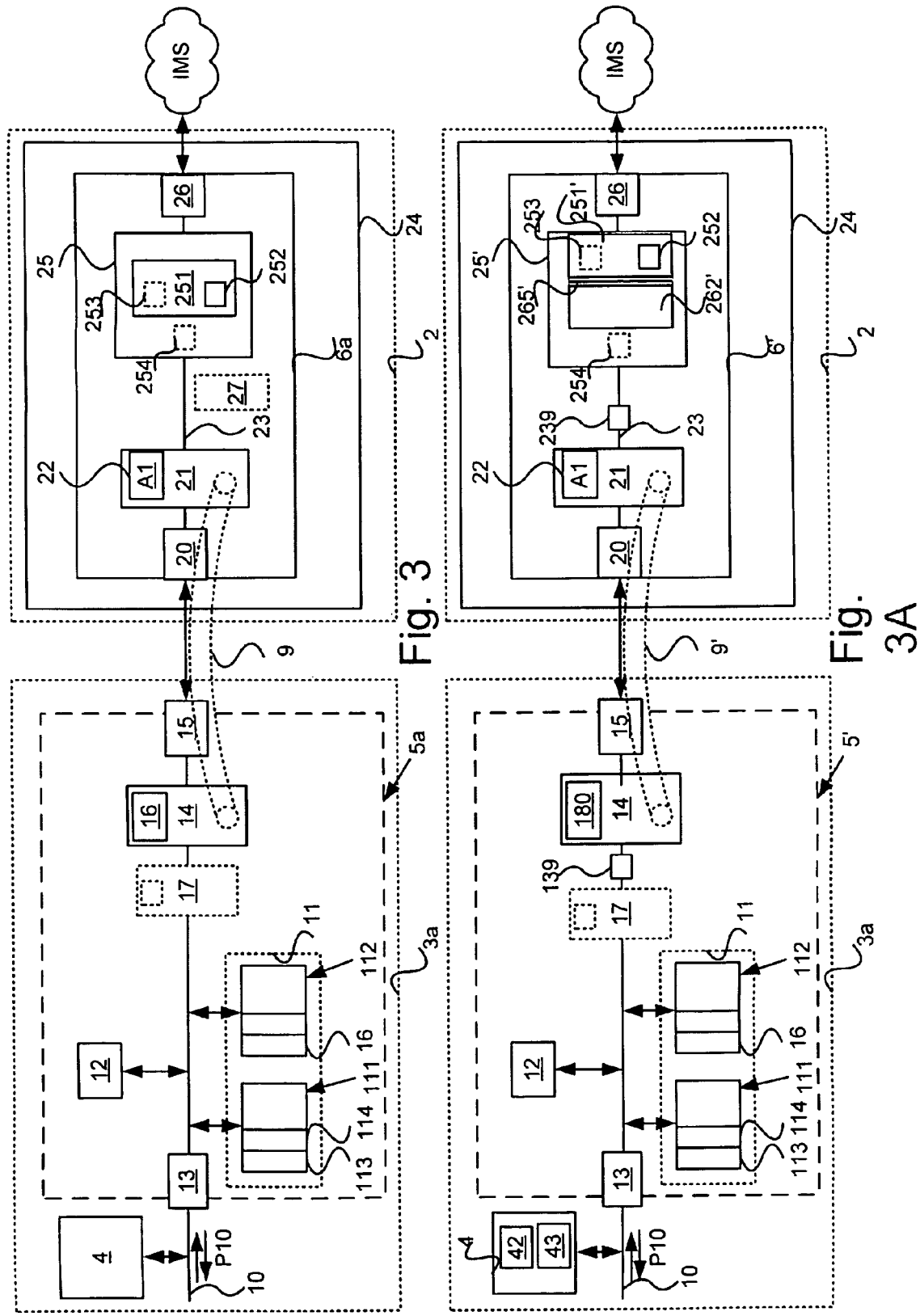

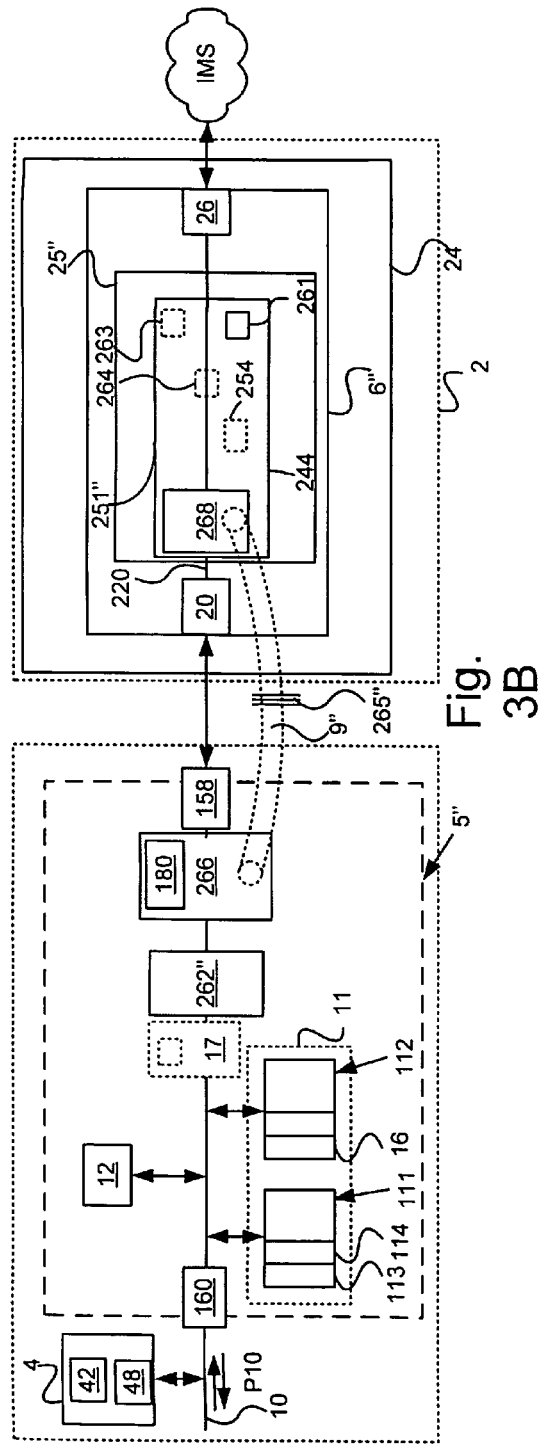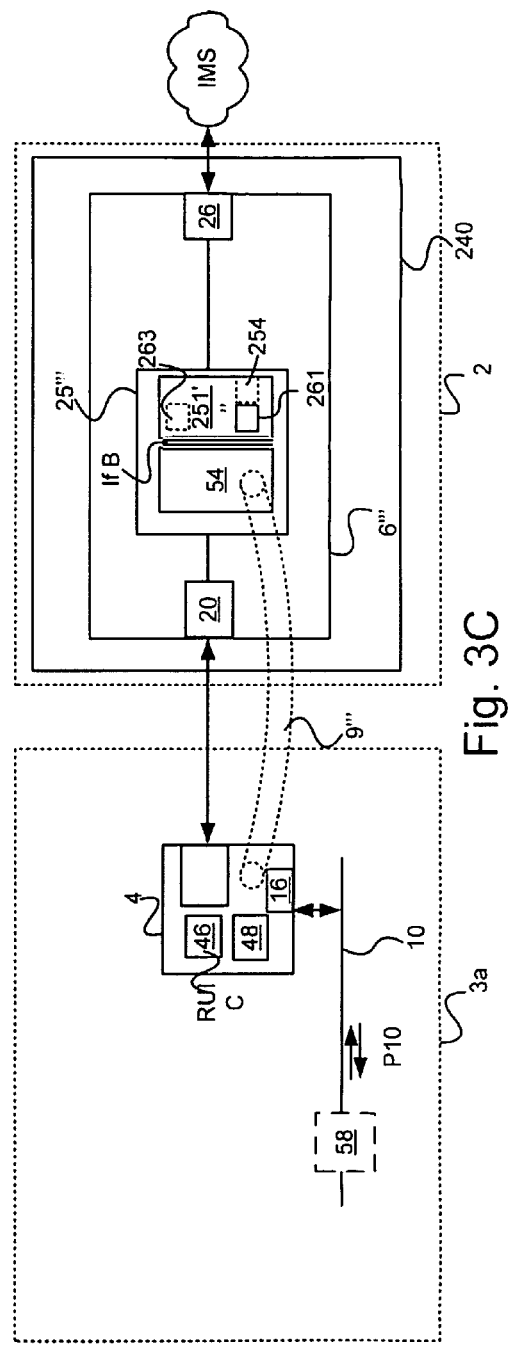

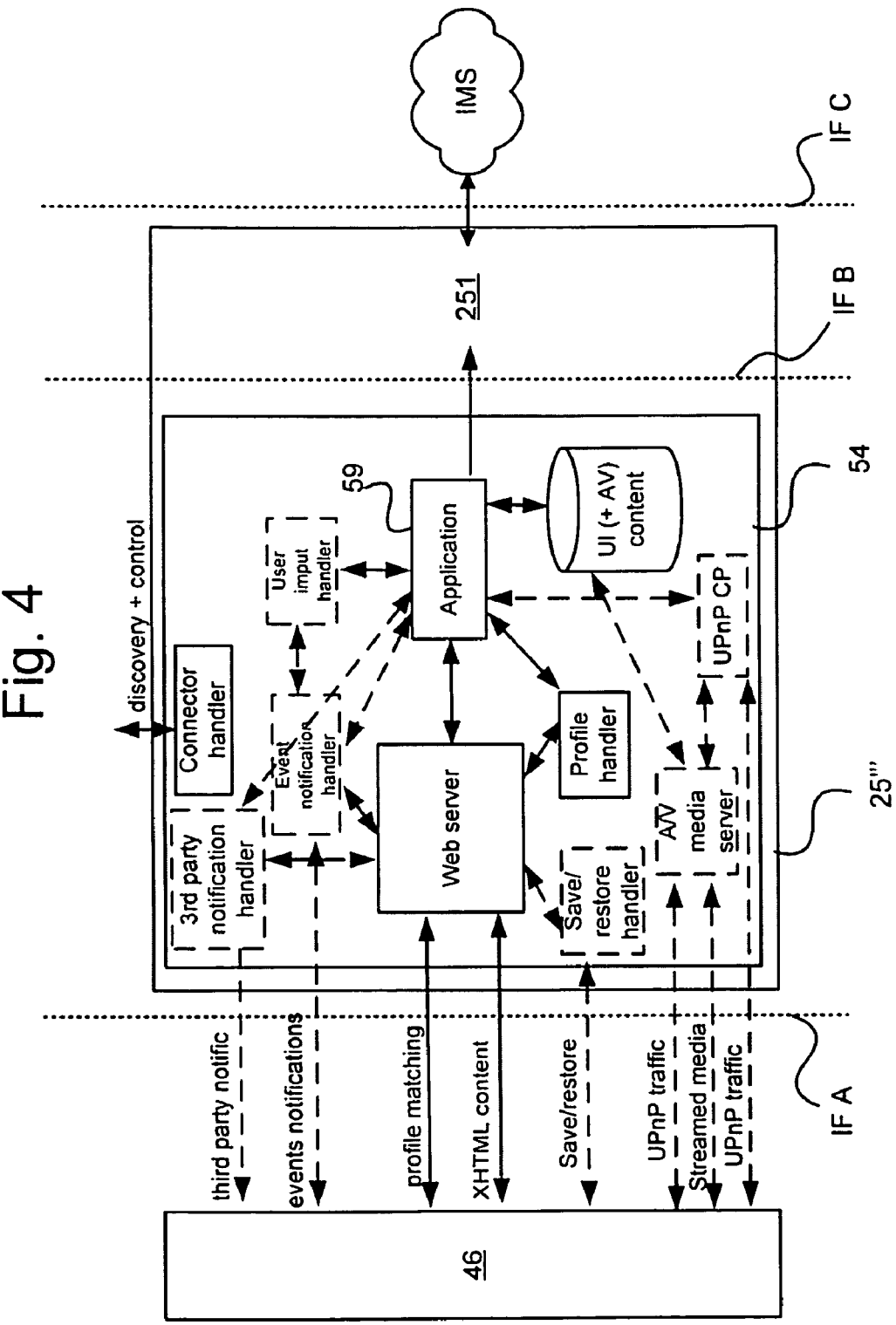

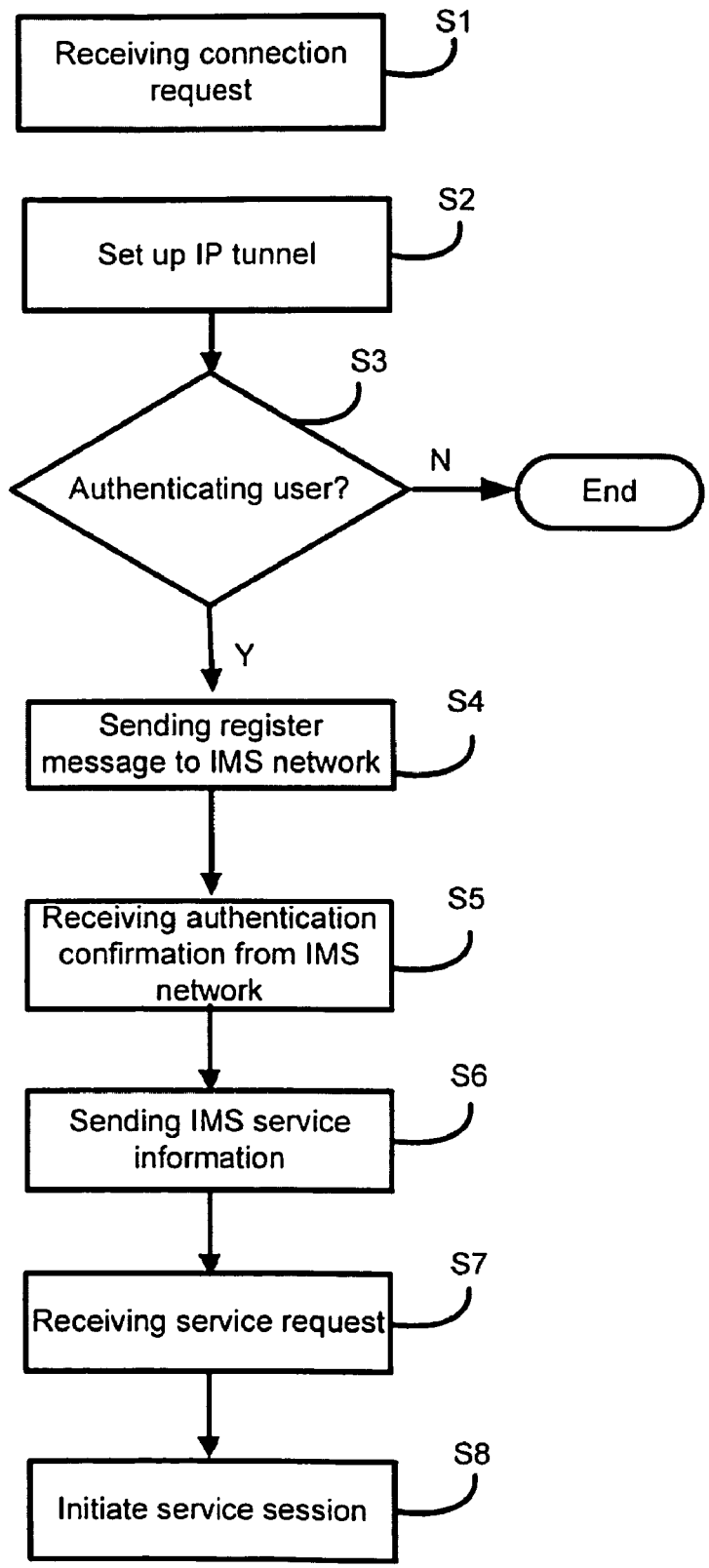

ACCESS NETWORK NODE AND METHOD FOR ACCESS NETWORK NODE

TECHNICAL FIELD

The invention relates to an access network node and a method for the access network node to enable a user of a user device to gain access to IMS (IP Multimedia Subsystem) enabled services.

BACKGROUND

A multitude of different types of communication terminals or devices have been developed for packet-based multimedia communication using IP (Internet Protocol). Multimedia services typically involve transmission of media in different formats and combinations over IP networks. For example, an IP-enabled mobile terminal may exchange media such as visual and/or audio information with another IP-enabled terminal, or may download media from a content server over the Internet.

A network architecture called IMS has been developed by 3GPP ($3^{rd}$ Generation Partnership Project) as a platform for handling and controlling multimedia services and sessions, commonly referred to as the IMS network. An IMS network can be deployed to initiate and control multimedia sessions for IMS-enabled terminals connected to various access networks, regardless of the access technology used. IMS allows rich person-to-person (client-to-client) as well as person-to-content (client-to-server) communications over an IP-based network.

It is desirable to generally provide IMS-based services for user devices in a limited local or private network such as a residential, factory, vehicle or office network, also referred to as LAN (Local Area Network) or PAN (Personal Area Network). In this description, the generic term "local network" is used to represent any such networks, and the term "user device" is used to represent any host/end system capable of IP communication within and/or outside a local network.

In order to provide IMS (enabled) services for non-IMS enabled user devices in the local network, a multimedia gateway has been suggested that can emulate an IMS terminal from the local network towards the IMS network, to access IMS services on behalf of any device in the local network. Such a multimedia gateway has been described in, e.g., WO-2007/071282-A1, in which it is referred to as a HiGA (Home IMS Gateway). A drawback with the proposed HiGA is that CPE (Customer Premises Equipment) and CE (Consumer Electronics) vendors may be hesitant to incorporating IMS specific functionality in their devices to be sold to users of LAN's. The placement of an ISIM-supporting (IP Multimedia Services Identity Module) card and the installation of IMS clients add to the overall cost and complexity of the devices that incorporates the HiGA. On the other hand the ability to deliver IMS multimedia services to local network devices is desired for an operator bearing upon business related to service delivery. So, the general problem of gaining access to IMS services for non-IMS user devices in a local network still remains if the local network is not provided with a HiGA.

SUMMARY

It is thus an object of the invention to enable end-users increased accessibility to services enabled by an IMS network.

Another object of the invention is to enable IMS enabled services to a non-IMS enabled user device without placing heavy demand on the end user's local network(s).

The invention relates to a method for an access network node to provide a user device access to a service enabled by an IMS network. The method comprises the steps of:
setting up an IP tunnel for communication with the user device,
sending an authentication request to the user device via the IP tunnel,
receiving a response to the authentication request from the user device via the IP tunnel,
authenticating the user device for communication with the access network node based on the response,
sending a registration request comprising an IMPU (IP Multimedia Public Identity) associated with the user device to an IMS network node for registration of the user device in the IMS network,
receiving a confirmation message from the IMS network node that the user device is authenticated for the service,
sending an authorization confirmation message via the IP tunnel to the user device that the user device is authorized for the service,
receiving a service request via the IP tunnel from the user device to start the service,
sending a service session initiation message to an AS (application server) associated with the service to start a service session between the user device and the AS.

The method may comprise the step of setting up the IP tunnel between the access network node and a local network node to which the access network node and the user device are connected.

In an embodiment of the method, the IP tunnel is a VPN (Virtual Private Network) tunnel established between a UPnP RA (Universal Plug and Play Remote Access) server and a UPnP RA client.

In an embodiment of the method, the authentication request, the response, the authorization confirmation message and the service request are be sent as API (Application Programming Interface) calls.

Another problem of gaining access to IMS services than the one mentioned above is when a user device is roaming outside of its associated local/home network, i.e. the network of a service provider with whom the user has an agreement. Today, in order to access operator services in another operator's network, a roaming agreement between the two operators must exist, and there are many issues that need to be addressed by the operators before arriving at such a roaming agreement for IMS services:
security relationships between network and user device, e.g. integrity protection, security negotiation, ciphering etc., and network to network, e.g. network domain security, inter-system trust relationships etc.,
mutual authentication (IMS level and above): serving/visited network—home network, user device—serving network, user device—local network,
common charging model, e.g. serving network needs to capture and provide to the local network all needed data items,
common SIP (Session Initiation Protocol) model, e.g. use identical models, SIP compression, extensions, use the same call flows etc.,
common QoS (Quality of Service) understanding for IMS sessions, including authorization and common mapping of different classes,
identities and addressing,
service transparency (proper handling of SIP per the common agreed model), and consistent support for: local services, emergency calls, geographic, location services, DTMF (Dual-tone Multi Frequency).

The above list of issues constitutes an obstacle for IMS operators to have roaming agreements. End users on the other hand would like to be able to access their services when outside of their operator's network.

The method may therefore in an embodiment comprise the step of setting up the IP tunnel directly between the access network node and the user device. Hereby is achieved that a user with Internet access that is remote from his local network is allowed to access IMS enabled services in a convenient way without having to take IMS roaming agreements into account.

In embodiments of the method, the IP tunnel may be a Hypertext Transfer Protocol over Secure Socket Layer connection.

The method may also comprise the steps of:
receiving the service request in the form of a UPnP message and translating the UPnP message to a Session Initiation Protocol message.

The method may in one embodiment comprise the step of receiving a connection request from the user device, before the step of setting up an IP tunnel for communication with the user device.

The invention also relates to an access network node for providing a user device access to a service enabled by an IMS network. The access network node comprises:
a first communications interface for communication with the user device,
a second communications interface for communication with an IMS network node,
a tunnel client for setting up an IP tunnel for communication with the user device, and
user identification means which enables the access network to:
send an authentication request to the user device via the IP tunnel,
receive a response to the authentication request from the user device via the IP tunnel,
authenticate the user device for communication with the access network node based on the response,
send a registration request comprising an IMPU associated with the user device to an IMS network node for registration of the user device in the IMS network,
receive a confirmation message from the IMS network node that the user device is authenticated for the service, sending an authorization confirmation message via the IP tunnel to the user device that the user device is authorized for the service,
receive a service request via the IP tunnel from the user device to start the service,
send a service session initiation message to an AS associated with the service to start a service session between the user device and the AS.

The tunnel client may in one embodiment of the access network node be adapted to set up the IP tunnel between the access network node and a local network node to which the user device is connected.

The tunnel client may in one embodiment of the access network node be a UPnP RA client or UPnP RA server.

The tunnel client may in one embodiment of the access network node be adapted to set up the IP tunnel in such a way that it terminates in a first end in the access network node and in a second end in the user device.

The tunnel client may in one embodiment of the access network node adapted to set up a HTTPs (Hypertext Transfer Protocol over Secure Socket Layer) tunnel.

The access network node may comprise a protocol translation means for translating a message from the user device into a Session Initiation Protocol message to the IMS network node.

The message from the user device may in one embodiment of the access network node be a UPnP message.

The user identification means may in one embodiment of the access network node comprise at least one software ISIM.

In one embodiment of the access network node, the user identification means comprises at least one ISIM card.

The invention may also relate to a computer program to provide a user device access to a service enabled by the IMS network, said computer program comprising code means which when run on the access network node causes the access network node to receive a connection request from the user device; setting up an IP tunnel, either directly with the user device or via a local network node to which the user device is connected, for communication with the user device; sending an authentication request to the user device via the IP tunnel; receiving a response to the authentication request from the user device via the IP tunnel; authenticating the user device for communication with the access network node based on the response; sending a registration request comprising an IMPU associated with the user of the user device to an IMS network node, e.g. a CSCF, for registration of the user in the IMS network; receiving a confirmation message from the IMS network node that the user device is authenticated for the service; sending a message via the IP tunnel to the user device that the user device is authorized for the service; receiving a request message via the IP tunnel from the user device to start the service; and sending a service session initiation message to the AS associated with the service to start a service session between the user device and the AS.

Another aspect of the invention may be a computer program product comprising a computer readable means and the computer program, wherein the computer program is stored on the computer readable means. The computer readable means may be a memory in the form of e.g. any non-volatile memory such as a ROM (Read-only Memory), an EPROM (Erasable Programmable ROM, an EEPROM (Electrically Erasable Programmable ROM), a flash memory, a hard disk, a DVD, a CD etc.

The invention may also relate to a local network node, e.g. a residential gateway, connected to
a user device in a local network, comprising:
a broadband port for communicating with an access network,
a port for communication with the user device,
storage means for storing an IP address of the access network node mentioned above,
a tunnel client/server for setting up an IP tunnel for communication with the access network node, and
communications means adapting the local network node to be able to:
receive an authentication request from the access network node to the user device via the IP tunnel and forwarding the authentication request to the user device,
receive a response to the authentication request from the user device and forwarding the response to the access network node over the IP tunnel,
receive an authorization confirmation message via the IP tunnel to the user device that the user device is authorized for the service and forwarding the authorization confirmation message to the user device,
receive a service request from the user device and forward the service request via the IP tunnel to the access network node.

The tunnel client/server in the local network node may be a UPnP remote access client/server.

The local network node may comprise a UPnP interface towards the user device and an API towards the access network node in order to expose a set of UPnP services and enable access of IMS services over a UPnP protocol stack.

The invention may also relate to a user device comprising a storage means for storing an IP address of the access network node mentioned above, an IMS service gateway control point which adapts the user device to set up and manage media sessions between the user device and an access network node or a local network node having a UPnP ISG (UPnP IMS service gateway), the IMS service gateway control point also adapting the user device to be able to:

use the IP address of the access network node to send a connection request via the local network node to the access network node, discover the UPnP IMS service gateway, receive an authentication request from the access network node via the local network node, send a response to the authentication request to the access network node via the local network node, receive an authorization confirmation message from the access network node via the local network node that the user device is authorized for the service, and send a service request to the access network node via the local network node.

The invention may also relate to a method for providing a user of a user device access to a service enabled by an IMS network, comprising the steps of:

sending a connection request from the user device to an access network node, either directly from the user device or via a local network node to which the user device is connected, setting up an IP tunnel between the access network node and either the user device or the local network node, sending an authentication request from the access network node to the user device via the IP tunnel, sending a response to the authentication request from the user device to the access network node via the IP tunnel, authenticating the user device for communication with the access network node based on the response, sending a registration request comprising an IP Multimedia Public Identity associated with the user device to an IMS network node, e.g. a CSCF (Call Session Control Function), from the access network node for registration of the user in the IMS network, sending a confirmation message to the access network node from the IMS network node that the user device is authenticated for the service, sending an authorization confirmation message from the access network node via the IP tunnel to the user device that the user device is authorized for the service, sending a service request from the user device to the access network node via the IP tunnel to start the service, sending a service session initiation message from the access network node to an AS associated with the service to start a service session between the user device and the AS.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 3 is a schematic, exemplary view of a local network node and an access network node according to the invention.

FIGS. 3A-3C are schematic views of three different main embodiments of the communications network system according to the invention.

FIG. 4 is a schematic view of the interfaces between the entities involved in an IMS session when the communications network system is designed in accordance with the embodiment illustrated in FIG. 3C.

FIG. 6 is a flow chart diagram illustrating a method for an access network node for setting up a service between a user device and an IMS network connected AS.

DETAILED DESCRIPTION

Figure 1:
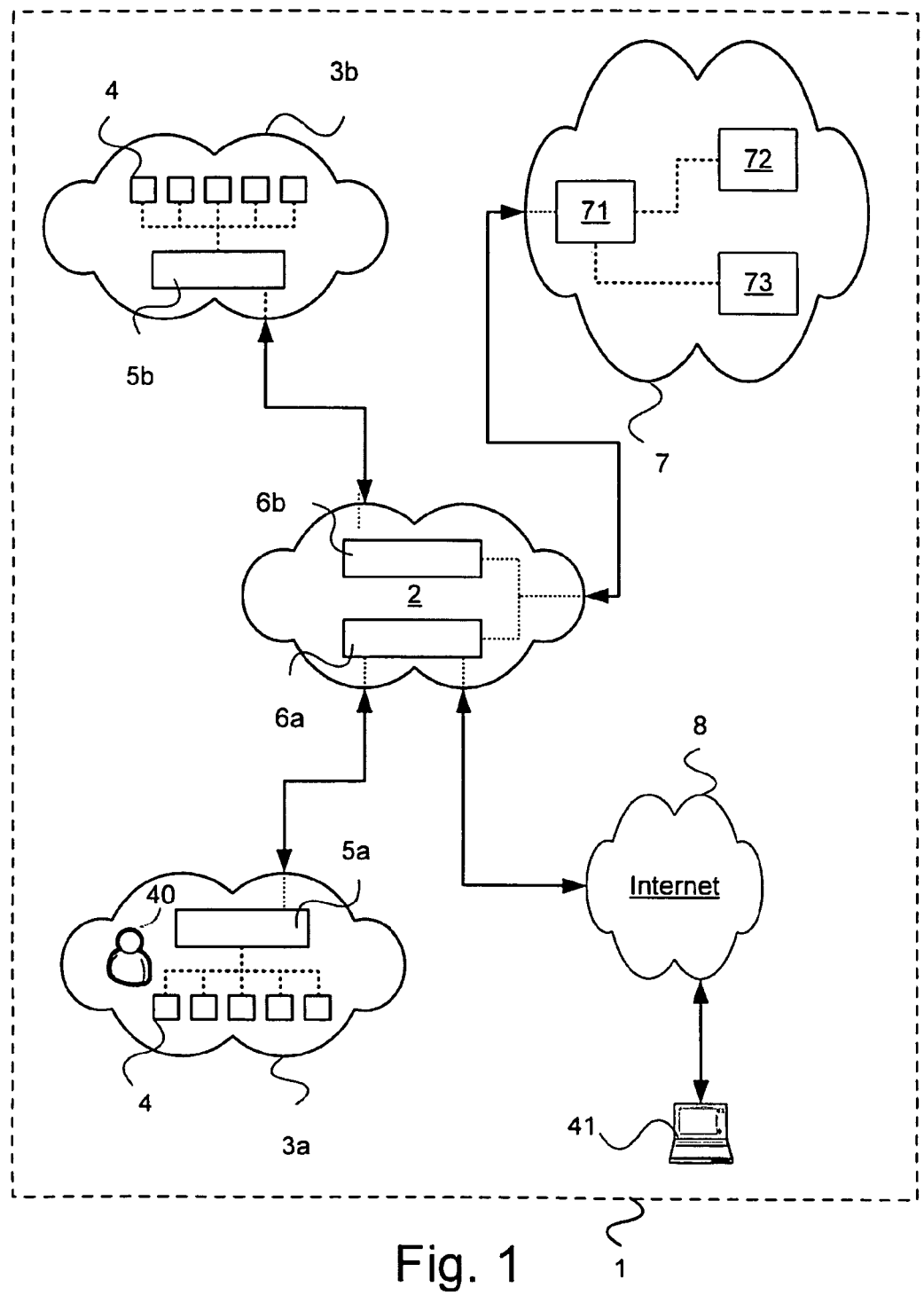
FIG. 1 is a schematic view illustrating a telecommunications network system according to an embodiment of the invention.

FIG. 1 is a schematic view illustrating a communications network 1 according to an embodiment of the invention. The communications network 1 comprises an access network 2 and at least one local network, in the shown embodiment a first local network 3a and a second local network 3b. A number of communications devices 4, e.g. PC:s (personal computer) comprising clients and web servers, PDA:s (Personal Digital Assistant), mobile phones, NAS (Network Attached Storage), IPTV STBs (set-top boxes), media players, media recorders, game consoles and A/V (Audio/Video) receivers, are comprised in the local networks so as to be able to communicate with other devices in the same local network. The local networks 3a, 3b, may include a wired or wireless LAN, and they may comprise a plurality of different devices within a family residence, a factory, an animal farm, an office or within a vehicle, such as a car, ship and truck.

The first local network 3a comprises a first local network node 5a, here in the form of an RGW (Residential Gateway), enabling communication with a first access network node 6a of the access network 2, and the second local network 3b comprises a second local network node 5b enabling communication with a second access network node 6b of the access network 2.

The Access Network 2 is coupled to a service network and it may also be connected to the Internet 8. The Service Network is in this embodiment an IMS Network 7.

The IMS network 7 includes an IMS network node comprising a CSCF server 71, which provides session control for subscribers accessing services within an IP Multimedia network. The CSCF server 71 comprises a SIP Server having responsibility for interacting with the access network 2. The CSCF server 71 may also have responsibility for interacting with an AAA server (Access, Authorization and Accounting Server) 72 for security, and with an AS 73, either directly or via a protocol conversion gateway such as an IM-SSF (IP Multimedia Switching Function) in the case of e.g. a CAMEL (Customised Applications for Mobile network Enhanced Logic) AS.

The local network nodes 5a and 5b enable communication between the local networks 3a and 3b and the access networks nodes 6a and 6b respectively. The functionality allowing a non-IMS enabled device in one of the local networks to receive services from the IMS network here resides in the access network 2. The functionality hence works as an access-network based IMS-enabling proxy and, therefore, this functionality will hereinafter be referred to as Access Network IMS proxy, or simply ANIP. However, the functionality may in alternative embodiments be comprised in a node in an IMS core network.

Figure 2:
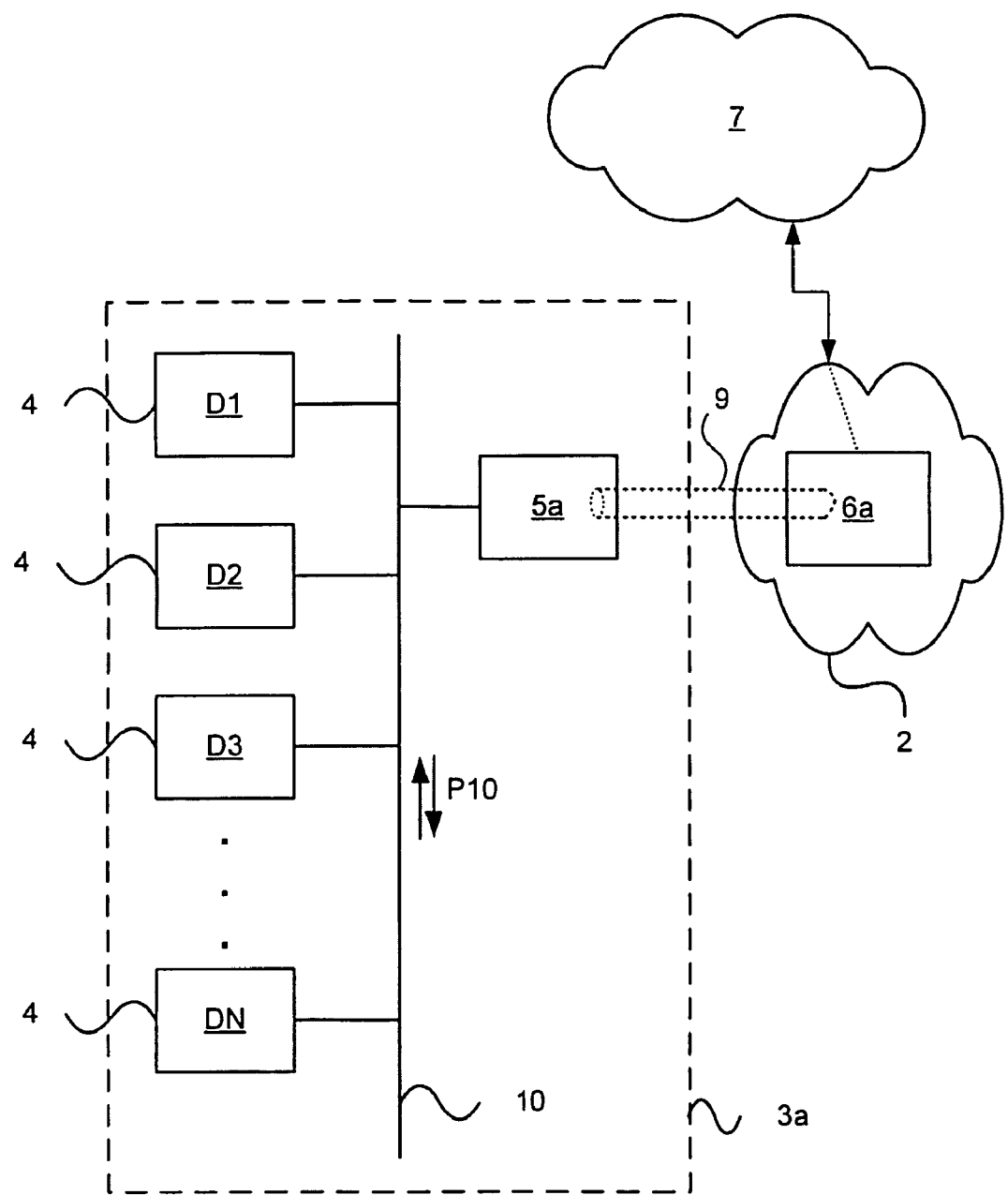
FIG. 2 is a schematic view illustrating a part of the telecommunications network system according to FIG. 1.

FIG. 2 is a schematic view illustrating a part of the communications network 1 according to FIG. 1. More precisely, FIG. 2 illustrates the first local network 3a being connected to the service network via the access network 2. When the communications network 1 is in operation, there will be a secure tunnel 9 connecting the local network node 5a with the access network node 6a, according to an aspect of the invention. Procedures for establishing such a secure tunnel will be described later in this document.

The first local network 3a may comprise a LAN 10 according to any type of Ethernet, IEEE 802.11 and IEEE 802.16 adapted to provide communication between the first local network node 5a and one or several communications devices 4. The first local network 3a may also allow communication between the individual communications devices 4 using a local area/local networking protocol P10. Likewise, the communication between a user device 4 and the first local network node 5a uses the local networking protocol P10. According to an aspect of the invention the local networking protocol P10 includes communication based on the UPnP (Universal Plug and Play) architecture.

UPnP is an architecture, developed in a multi-vendor collaboration called the UPnP Forum, for establishing standardized device protocols for the communication between different IP devices in a local network using different access technologies, operating systems, programming languages, format standards and communication protocols. UPnP further provides standardized methods to describe and exchange device profiles that may include capabilities, requirements and available services in the devices. When UPnP is used in a local network, such as the first local network 3a, all UPnP enabled user devices 4 are connected to the same IP sub-net and can discover each other.

The UPnP defines devices (these are software modules) which can be seen as profiles describing the interaction between physical devices that host the UPnP devices. UPnP specifies several profiles that an ISG (IMS Service Gateway) relies on, namely the AV (Audio/video profile and IGD (internet gateway) profile. The AV profile specifies how to set up a media session between an MR (media renderer) device and an MS (media server) device based on the 2-box or 3-box model. The box models specify if a UPnP CP (Control Point) resides within the MR (2-box) or if it's external to both MR and MS (3-box). The IGD profile among other things specifies the interaction between a CP and an RGW needed for creating NAT (Network Address Translation) bindings.

According to another aspect of the invention the local networking protocol P10 includes communication based on Bonjour. Other alternative protocols that may be used for embodying the local networking protocol P10 include: OSGi, Jini, Zero Configuration Networking, Dynamic Host Configuration Protocol, and WS-Discovery (Web Services Dynamic Discovery).

The user devices 4 may include a telephone D1, a laptop computer D2, media server D3, television box (not illustrated), which may be referred to as a STB, and/or a media player (not illustrated). There may be a plurality N of devices within the first local network 3a, where N is a positive integer.

The user devices D1-N may be a combination of IMS devices and non-IMS enabled devices. Furthermore, any non-IMS enabled device may or may not be a SIP device. Examples of non-IMS but SIP enabled terminals are SIP telephones and PCs, whilst examples of non-IMS terminals that do not have SIP functionality are legacy telephones including DECT (Digital Enhanced Cordless Telecommunications) telephones and IP devices with UPnP support, such as STBs.

FIG. 3 is a schematic view of the first local network node 5a and the first access network node 6a according to an embodiment of the invention. The first local network node 5a includes a logical block 11, which has a first memory section 111 for storing computer program code, and a second memory section 112 for storing data. The first local network node 5a also comprises one or several processing means, represented here by a processor 12. When it is stated, in this document, that the first local network node 5a performs a certain function, it is to be understood that processing means, such as the processor 12, executes computer program code so as to cause that function to be performed.

The first memory section 111 comprises a communication start-up program 113, as well as a tunnel client 114 (which also can be termed as a tunnel server in a client-server communication description model). The communication start-up program 113 includes a function for receiving a request for a service from one of the user devices 4 comprised in the first local network 3a. When a user device 4 sends a request for a service, that request may be received on a port 13 of the first local network node 5a, and upon detecting that request the processor 12 will cause the relevant program function in the first memory section 111 to be executed. The reception of the service request will cause the communication start-up program 113 to initiate a procedure for establishing secure communication with the IMS network. The procedure for establishing secure communication includes the setting up of the secure tunnel 9 between the first local network node 5a and the first access network node 6a with which it is associated. The setting up and the maintenance of the secure tunnel 9 is performed by executing the tunnel client 114. A corresponding tunnel client and/or server is comprised in the first access network node 6a.

The tunnel client 114 will effectively set up the secure tunnel 9 so that an end point of the secure tunnel 9 will be at a local network node tunnel termination point 14 in the first local network node 5a. Secure tunnel communication enabling encrypted packet traffic to be securely communicated between different networks (or between a host and a network, or between different hosts) is well-known to a person skilled in the art and need not to be further described herein. The secure tunnel may be set up using different techniques, which techniques will be further discusses below with reference to different embodiments of the invention. The encryption of the data run via the secure tunnel 9 can be performed using any known technique, such as IPsec (IP Security) which is a mandatory part of IPv6 and optional for use also with IPv4 (Internet Protocol version 4) and implemented by a set of cryptographic protocols for securing packet flows, mutual authentication and establishing cryptographic parameters. Thus a secure communication will pass via a first broad band port 15 at the physical location where the first local network 3a is installed. Hence, whereas the actual exchange of digital data runs over the broad band port 15, there is in a functional sense a secure tunnel 9 having the local network node tunnel termination point 14 within the local network node 5a.

In the second memory section 112 of the logical block 11, there is stored an address 16. The address 16 stored in the first local network node 5a points at the individual network access node 6a in the access network 2 which is associated with the first local network node 5*a*. It is to be understood that in a commercial implementation the access network 2 may comprise a large number of access network nodes. This IP address 16 is used to set up the secure tunnel 9. The address 16 to a particular access network node may also be stored by the individual user device 4 within the first local network 3*a*.

The first local network node 5*a* may optionally comprise protocol translation means 17. The protocol translation means 17 can be used to translate the data communicated within the LAN to which the user device 4 belongs to another communication protocol before transmitting it to the first access network node 6*a*. For example, if the data communication within the LAN 10 and received on the port 13 of the first local network node 5*a* conforms to a networking protocol other than UPnP, e.g. Bonjour, the first local network node 5*a* may be arranged to translate the received communication before transmitting it to the first access network node 6*a* of the access network 2.

Although the protocol translation means 17 is depicted as a separate block, it should be understood that the translation functionality may be implemented by means of computer program code stored in e.g. the first memory section 111, which program code, when executed by the processor 12 somewhere in the first local network node 5*a*, can perform conversion between different communications protocols.

According to one embodiment of the invention, all the functions of the first local network node 5*a* are comprised in an RGW. Although the first local network node 5*a* has been described above as a device comprising a processor 12 and computer code for performing a number of functions, it is to be understood that the execution of these and other functions may be distributed within the first local network 3*a*. According to one embodiment of the invention, the communication start-up program 113 is performed by a home server, which receives the request from a device 4 over the first local network 3*a*, and the setting up of the secure tunnel may be performed by the RGW. In this distributed embodiment of the invention there may be one processor in the home server and a different processor in the RGW. It should thus be understood that the first and second memory sections 111 and 112 illustrated as parts of the logical block 11, as well as the processor 12 and protocol translation means 17 may be distributed amongst various physical nodes/devices in the first local network 3*a*, and that the first local network node 5*a* should not necessarily be considered as a physical device but as a concept for facilitating description of certain functionality residing in the first local network 3*a*.

The first access network node 6*a* comprises a first communications interface 20 in the form of a second broad band port in communication with an access network tunnel termination point 21. The access network tunnel termination point 21 is connected via the secure tunnel 9 to the local network node tunnel termination point 14 in the first local network node 5*a*. The address 16 in an address memory section of the first local network node 5*a* will be the IP address to the access network tunnel termination point 21. For the purpose of illustration, an address field 22 carrying the IP address A1 of the access network tunnel termination point 21 is depicted in the drawing. As should be understood by a person skilled in the art the access network tunnel termination point 21 may be implemented in an IP tunnel client being a part of a computer program 27 which when run by a processor in the first access network node 6*a* causes the access network node 6*a* to set up the secure tunnel 9 and the access network tunnel termination point 21.

A data bus may connect the second broad band port for connecting it to the access network tunnel termination point 21. Accordingly, when in operation, the communication on the databus will be embedded as secure tunnel communication. Such secure communication will be passed via the second broad band port at a physical location of the access network 2 in which the first access network node 6*a* is located. Hence, whereas the actual exchange of digital data between the first local network node 5*a* and the first access network node 6*a* runs over the first and second broad band ports, it runs in a functional sense over the secure tunnel 9 having a tunnel termination point at each node.

The access network tunnel termination point 21 includes functionality for decrypting the data received via the secure tunnel 9 and deliver decrypted output data to a connection 23. Accordingly, any message sent by a user device 4 to the first local network node 5*a* in the first local network 3*a*, will be delivered decrypted on the connection 23 from the access network tunnel termination point 21.

The system is preferably set up so that the access network tunnel termination point 21 is positioned inside a physically secure environment 24, e.g. a physical security shell, designed to prevent unauthorized people from being able to reach the communication as it leaves and enters the secure tunnel 90. Preferably, the complete access network 2 and the plurality of access network nodes comprised therein are confined within such a physically secure environment 24. However, there may be parts of the access network that are placed outside of the physically secure environment 24.

ANIP 25 functionality of the first access network node 6*a* is represented by a box in FIG. 3 and will, for the sake of simplicity, sometimes be referred to as if it was a physical entity or device throughout this description. It should however be appreciated that ANIP 25 rather is to be interpreted as a logical module which may or may not be distributed among a plurality of devices in the first access network node 6*a*.

The ANIP 25 is adapted to communicate at one hand with the first local network 3*a* via the access network tunnel termination point 21, and on the other hand with an IMS network via a second communications interface 26 in the form of a second port which typically connects to a CSCF server of the IMS network, e.g. the CSCF server 71.

The ANIP 25 comprises an ANIP core 251 which comprises functionality allowing non-SIP data received from user devices 4 or a communications device 41 connected to the access network 2 via the Internet 8 to communicate with the SIP-based IMS network. The ANIP core 251 comprises protocol translation means 252 and is adapted to receive the decrypted data outputted from the access network tunnel termination point 21, whereupon the protocol translation means 252 translates the data to conform to the SIP protocol so that it can be communicated to and interpreted by the IMS network. The ANIP core 251 of the ANIP 25 hence handles interoperability issues like conversion between SIP and non-SIP protocols and thus works as what is sometimes referred to as a SIP gateway. The first access network node 6*a* is thus arranged to receive encrypted data over a secure connection 9, decrypt the received data and convert it to conform to the IMS SIP protocol, and transmit SIP messages to the IMS network.

Optionally, the ANIP core 251 comprises protocol identification means 253. Although the data received by the first network access node 6*a* on the second broad band port typically conform to non-SIP protocols it may, when originating from an IMS enabled user device 4, be SIP data. The protocol identification means 253 or functionality, which typically is implemented as software, identifies the communication protocol on which this data is based. If the received data is found to be SIP data, the protocol identification means 253 can inform the protocol translation means 252 that no conversion to SIP is needed and hence make sure that the protocol translation process in the ANIP 25 is bypassed. If, on the other hand, the data output by the access network tunnel termination point 21 is recognized as non-SIP data by the protocol identification means 253, it makes sure that the data is run via the protocol translation means 252 which then converts the data stream to SIP data before it is sent to the second port for further transmission to the IMS network. It should be appreciated that there are many ways in which the protocol identification means 253 can indicate whether the received data need to be converted to SIP or not. For example, the protocol identification means 253 can be arranged to set a flag indicating whether the data output by the access network tunnel termination point 21 is based on SIP or not, and the protocol translation means 252 or other means in the ANIP core 251 can comprise means for identifying said flag. If the flag indicates that the data is non-SIP data, the protocol translation means 252 converts it to SIP whilst, if the flag indicates that the data already is encoded according to the SIP protocol, it is forwarded to the second port as is.

Protocol identification functionality, such as the protocol identification means 253, may also be included in the optional protocol translation means 17 of the local network node 5a for identifying whether the data received on the port 13 already conforms to the communication protocol that is desired to use for the communication with the access network node 6a.

Furthermore, the ANIP 25 comprises user identification means 254. The user identification means 254 serves to identify the user/subscriber requesting an IMS service.

The user identification means 254 may be implemented as software ISIM (soft ISIM). In such a case the user identification means 254 typically comprises a database storing service-subscriber keys IMSIs (International Mobile Subscriber Identity), each associated with a user credential such as a PIN code linked to a user/subscriber 40 in the first local network 3a, as well as a SIM software component and processing means for running said component. When a service request is sent from a user device 4 in the first local network 3a, the SIM software component is executed. The execution of the software component may involve the step of displaying an IMS "login page" on the user device screen over a GUI (Graphical User Interface), asking the user to input user credentials, in this example the PIN code. The user credentials are then compared with the user credentials stored in the database and, if a match is found, the user is authorized to gain access to the ANIP 25.

The user identification means 254 may also be implemented by means of ISIM cards. As well known in the art, an "ISIM card" is actually an application running on a UICC (Universal Integrated Circuit Card) smart card. The ISIM holds files regarding a user's subscription level as well as authentication, security information and their IMPI (IMS private identity) held in the form of a NAI (Network Access Identifier).

The ANIP 25 may comprise a plurality of such ISIM cards, each associated with a user/subscriber, such as a user associated with the first local network 3a. When the user request an IMS service, or automatically when the user connects his user device to the network, access control of the user is performed by the user identification means 254 by verifying that the user identity corresponds to the private user identity contained on one of the ISIM cards in the ANIP 25. By storing ISIM cards associated with the different users/user devices of the first local network 3a in the first access network node 6a instead of in each user device 4, the overall cost and complexity of the user devices can be greatly reduced.

The user identification means 254 of the ANIP 25 prevents IMS subscription hijack by intruders who may have gained access to the first local network 3a.

Another layer of security could be user device authentication based on certificates. This would limit access to the ANIP 25 to only authorized devices. Copper access security provided by the access network provider could serve as a third level of security. A restriction could be applied so that only devices in e.g. the first local network 3a with a valid IMS subscription could have the permission to access the ANIP 25.

It should be understood that the functional steps performed by the different entities in the first local network node 5a and the first access network node 6a described above are reversible, i.e. that communication between the user device 4 in the first local network 3a and the IMS network 7 is bidirectional. So, for example, is the ANIP 25 arranged to receive SIP data from the second port and, by means of the protocol translation means 252, convert it to conform to a desired non-SIP communications protocol which is interpretable by the first local network 3a. The access network tunnel termination point 21 is arranged to encrypt the non-SIP data and transmit it via the secure tunnel 9 to the local network node tunnel termination point 14 which, in turn, decrypts it and passes it on to the user device that has demanded the IMS service.

The first access network node 6a described above allows for a non-IMS enabled user device 4 in the first local network 3a to access IMS services. This is achieved by means of the ANIP 25 which acts as a proxy between user devices 4 in the first local network 3a and IMS enabled services.

One major advantage achieved by the ANIP 25 is that, contrary to the case when all IMS-enabling functionality resides in a local network, the ANIP 25 can be used to not only act as a proxy between user devices in the local network and the IMS, but also as a proxy between user devices being remote from their local network and the IMS. As will be described in more detail below with reference to FIGS. 3A-3C, this is achieved by establishing a secure connection from the remote user device to the ANIP over e.g. the GPRS (General Packet Radio Services), WiMAX or HSPA (High Speed Packet Access) or LTE (Long Term Evolution) network. This 'remote-IMS access solution' is applicable not only to mobile user devices but also fixed devices connected to the Internet 8 without being a part of the first local network 3a.

The first access network node 6a comprising an ANIP 25 thus provides an alternative access to IMS services and it does not require any roaming agreements between IMS operators. By creating a secure connection to the ANIP 25 over the GPRS or HSPA network, a user (e.g. communications device 41 in FIG. 1) being remote from his local network can access the IMS services provided by his home IMS operator. The invention thus allows for a travelling user to, remotely from his local network, access the IMS network in a convenient way. Since no operator roaming agreements are needed the user can also utilize the services to a potentially, substantially lower cost. It should, however, be understood that the proposed ANIP solution for remote IMS access would require that the user device has Internet access and the ability to create a secure connection to the ANIP, which can be done over e.g. a GPRS, HSPA WiMAX or LTE network.

Another problem solved by the ANIP 25 is that, today, in order for a user device in a local network to address IMS services, data must be converted to and from SIP in the actual user device, or at least in some node/device in the local network through which user data is communicated to the access network. By providing the ANIP which allows data conversion to take place in the access network, the cost associated with providing IMS services to end-users is shifted from manufacturers of user/near-end user equipment to access network operators. This is advantageous in that network operators may be more willing to take the cost associated with implementing IMS-enabling functionality for non-IMS enabled devices since they should be able to have a good return on investment as end-users connects to the access network to utilize the various IMS services.

Another obvious advantage achieved by the ANIP solution is that user/near-end user equipment can be made less complex and smaller in size as it does not need to incorporate all functionality required to access IMS services. Furthermore, regarding the user identification means 254 in the ANIP implemented as software and soft ISIM, the advantages with a soft ISIM instead of costly hardware UICC:s can be utilized in a safer way by the access operators, since a soft ISIM in a local network node probably would be more exposed to illegal tampering.

Now turning to FIGS. 3A-3C, three embodiments of the communications network system according to the invention will be described in more detail.

Embodiment A

The UPnP RA Alternative

In FIG. 3A, the user device 4 is a DLNA (Digital Living Network Alliance) compatible device or any other device comprising an ISG CP (IMS Service Gateway Control Point) 42 and a UPnP MR 43 with a UI (User Interface). Alternatively the ISG CP could be in the first home node 5' (not shown).

An ISG CP is a logical module that is a part of the UPnP ISG architecture, which will be further described below. The ISG CP is a UPnP entity having a UPnP AV architecture that specifies that the CP features are manufactured dependent on the controlled UPnP device. The CP is designed to set up and manage media sessions between a UPnP ISG, which also will be described in more detail below, and the user device in which the CP is located. It should be understood that ISG CP should be interpreted as a logical module rather than a hardware device.

A UPnP MR is also a logical module in the UPnP ISG architecture and is a standard UPnP media renderer capable of rendering HTTP (HyperText Transfer Protocol) or RTP (Real-time Transport Protocol) data.

The DLNA (enabled) device is a consumer electronics media device and may be e.g. a TV, telephone that advantageously has an IP interface, a PC, e.g. a lap-top, a PDA, media module, game console, home theatre receiver, disc player or the like.

In this embodiment of the invention, the UPnP remote access architecture is used for the connection between the local network node 5' and the access network node 6'. UPnP remote access architecture is as such known to a person skilled in the art and is defined by the UPnP Forum for providing a mechanism that allows generic UPnP devices, services and control points deployed in remote physical devices to interact with the corresponding UPnP devices, services and control points physically attached to the local network. The mechanisms defined in the architecture will allow to extend the local network so that it will logically include the remote devices and thereby all devices will be able to communicate among themselves using various UPnP mechanisms. The desired behaviour of the interactions between the remote device and home devices is to be similar with the one expected as if all devices are located in the same local area network. In order to accommodate the above mentioned goals, the UPnP RA architecture provides means to connect the two segments of the extended local network using established mechanisms. Remote access architecture undertakes the provisions needed in order to minimize the adverse effects of the internal and external factors and bring the remote user experience as close as possible to the one available in the local area network. Use of UPnP RA is however new to a person skilled in the art in the way it is used in this embodiment.

In this embodiment of the invention, the local network node 5', which could be the first local network node 5a, comprises a local network node UPnP remote access agent (H-RA) 139. The H-RA 139 is responsible for setting up and maintaining the secure tunnel 9' to the access network node 6', which could be the first access network node 6a. When doing so, the H-RA 139 makes use of the address 16 stored in the local network node tunnel termination point 14 and pointing at the access network node tunnel termination point 21. The secure tunnel 9' is, in this embodiment, hence established by means of an UPnP RA connection.

The access network node 6' comprises a corresponding access network node UPnP remote access agent (A-RA) 239 which, in a way similar to that of the H-RA 139 in the local network node 5', serves to establish and maintain the secure tunnel 9' between the tunnel termination points 14 and 21 of the home 5' and access network 6' node, respectively.

As previously mentioned, the communication between the various devices 4, and between one of the devices 4 and the local network node of the first local network 3a, is based on a local networking protocol P10 which may be any of a plurality of suitable communication protocols. This applies also to this first embodiment. However, since the data transmitted over the RA connection is UPnP data, the local network node 5' comprises the protocol translation means 17 if the internal communication within the local network 5' conforms to a networking protocol P10 other than UPnP, e.g. the Bonjour protocol. In such a case, the protocol translation means 138 serves to convert the non-UPnP data received from a user device 4 via the port 13 to UPnP data. As described above, the local network node tunnel termination point 14 then typically encrypts the UPnP data and transmits it to the access network node 6' over the secure tunnel 9'.

The encrypted UPnP data is decrypted at the access network tunnel termination point 21 and passed on decrypted to the ANIP 25' via the connection 23. The UPnP interface of the ANIP 25' is implemented by a UPnP ISG 262'.

The UPnP ISG' 262' is a UPnP-based logical module that exposes a set of UPnP services which enable access of IMS services over the UPnP protocol stack. The UPnP ISG 262' serves as an intermediate entity between UPnP and the ANIP core 251' and has two interfaces: a UPnP interface and an interface to the ANIP core 251' via an API 265'. The UPnP interface is a set of services and corresponding actions that the UPnP ISG 262' advertises to the first local network 3a. The UPnP ISG-ANIP core API 265' enables media sessions to be established between IMS entities and UPnP entities. The API 265' takes care of relying information regarding media formats and transport protocols used for establishing media sessions in UPnP and IMS SIP. Besides the UPnP ISG 262' itself, the UPnP ISG architecture typically comprises an ISG CP module, a UPnP MR module, and a UPnP MS module. The two first-mentioned modules were briefly described above with reference to the DLNA devices 4. The last-mentioned module, UPnP MS, serves in the context of the UPnP ISG architecture as an input device for user media data, e.g. a UPnP camera, microphone etc.

The ANIP 25' allows the UPnP ISG 262' to incorporate a minimum of ISG functionality. In a minimalistic implementation, the UPnP ISG 262' would be a modified UPnP CP that is able to set up a media session using the AV profile between a UPnP MR of a DNLA-compatible user device 4 in the first local network 3a and the ANIP 25', thus acting as an IMS media termination point. A minimalistic UPnP ISG 262' would, besides comprising functionality allowing media sessions to be established using UPnP AV, also comprise functionality allowing the UPnP internet gateway (IGD) profile to be used to create relevant NAT bindings. Thus, typically, the UPnP ISG 262' of the ANIP 25' can be seen as a modified UPnP CP which supports the UPnP AV and UPnP IGD profiles and has an internal interface to the ANIP 25'.

The access network node 6' according to this embodiment thus comprises means, such as the A-RA 239 and the access network tunnel termination point 21, for receiving UPnP data over a secure RA connection from the first local network 3a, and means, such as the ANIP 25' comprising UPnP ISG 262' and ANIP core 251' functionality comprising at least protocol translation means 252, for translating said UPnP data so that it conforms to the SIP protocol, and transmitting it to an IMS network. Thereby, the access network node 6' allows for a non-IMS user device 4 to access IMS services provided by an IMS network by establishing an RA connection to the access network node 6'.

The ISG CP 42 of the user device 4 is typically pre-configured with the IP address of the A-RA 239 of the access network node 6'. This allows for a user to connect to the A-RA 239 of his "home" access network node 6' over e.g. a secure Internet connection (which could be over a fixed or wireless medium e.g. DSL (Digital Subscriber Line), GPRS or HSPA), even when being remote from his local network 3a. Hence this embodiment is particularly good for giving access of IMS services to a non-IMS user device even if it is outside of its local network provided that the user device supports UPnP remote access.

Although this embodiment translate to UPnP as data goes to and from the first network 3a over the secure tunnel 9', a person skilled in the art would appreciate from the description of the embodiment that there could be other analogous, possible non-UPnP solutions, such as Bonjour, that in the future could be provided with a remote access 'extension' to a protocol with similar functions as UPnP RA. Such analogous non-UPnP solutions could work in the same way as in this embodiment and there would then naturally not be necessary to translate to UPnP before data is sent over the secure tunnel 9', e.g. if Bonjour is provided with remote access means. In such an analogous solution an ISG device corresponding to the UPnP ISG 262' could be termed, in this case for illustration purposes only, a person skilled in the art would think of e.g. a ZeroConf ISG or Bonjour ISG devices based on the teaching of this embodiment. The local network node and the corresponding access nodes could in such analogous embodiments be provided with Bonjour remote access clients or Zero Conf remote access clients if such are developed.

Embodiment B

The API Alternative

An alternative implementation to UPnP RA (i.e. embodiment A described above) could be to have an ISG located in the local network node and use a proprietary protocol between the ISG and the ANIP in the access network node. According to this embodiment of the invention (embodiment B) only API calls are exchanged between the local network node and the access network node.

A local network node 5" and an access network node 6" according to this embodiment are illustrated in FIG. 3B. The local network node 5" and the access network node 6" comprise a respective HTTP application 266 and 268, such as a HTTPs, for establishing and maintaining a secure tunnel 9". That is, the secure tunnel 9" is in this embodiment set up as a secure HTTP connection 9" using HTTPs. The HTTP application 268 is here included in the ANIP core 251".

The local network node 5" is further seen to comprise a UPnP ISG 262". In accordance with the UPnP ISG 262' in embodiment A, the UPnP SG 262" serves as an intermediate entity between UPnP and the ANIP core 251", only now the UPnP ISG 262" is located in the local network node 5" while the ANIP core 251" still resides in the access network node 6". The API 265" serving as an interface between the UPnP ISG and the ANIP core 251" is hence in this embodiment an interface over the secure HTTP connection 9", where API calls are responsible for ANIP function invocation, which will be further described below in conjunction with FIG. 5B.

The user devices 4 in the local network 3a comprise, also in this embodiment, an ISG CP 42 and may of course include an MR and/or an MS.

Embodiment C

The CEA-2014 Alternative

CEA-2014 defines a mechanism that allows user interfaces to be remotely displayed on and controlled by devices or CPs (Control Points) other than the one hosting the logic. CEA 2014 is composed of three distinct parts: a UPnP-based framework for locating and rendering user interface content on the local network, a UPnP-based home user interface server specification, and a browser specification employing an XHTML (Extensible HyperText Markup Language) profile also referred to as 'CE-HTML'. CE-HTML is constructed upon existing W3C standards including XHTML 1.0, CSS-TV (Cascading Style Sheets TV) and ECMA-262 (this standard defines a scripting language for browsers is also known as Javascript). It however goes beyond the W3C foundation in the detailed specification of browser behaviour designed to deliver optimum user experiences on common consumer electronics devices. Using existing web standards for UI content (e.g. XHTML) and supporting a variety of different consumer client devices (STBs, TVs, mobile phones) CEA-2014 allows for dynamic interaction between Remote UI Clients as well as provides timely, partial UI updates from a Remote UI Server.

The Open IPTV Forum specifies a common and open end-to-end platform for supplying variety of internet multimedia and IPTV services to retail based CE, either over QoS-controlled managed network or over the public Internet. The Open IPTV forum specifies a so-called ITF (IMS termination function) providing functionality which according to this embodiment of the invention also can be provided by the proposed ANIP solution. ITF consists of two main modules relevant to this application: the piIPTV-DLNA Application Gateway (piIPTV-DLNA AGw) and IMS middleware. The piIPTV-DLNA AGw performs the following functions:
  receives media from a piIPTV Media Player,
  translates the media into formats and content protection
    schemes that conform to the DLNA specifications, and sends the media to a DLNA device, i.e. a device specified so that it is compatible/certified with the DLNA specifications, receives the metadata, translates it, and sends it to the DLNA devices over the local network, may act as a SIP Client, using the IMS Middleware to perform registration on behalf of DLNA devices.

The piIPTV-DLNA Application Gateway also sets up media sessions on behalf of non-SIP (UPnP/DLNA) home devices.

The IMS Middleware consists of a number of sub-functions:

IMS UA (User Agent), which also has functions to manage the ISIM

Control function for a home NAT, and

GBA (Generic Bootstrapping Architecture) Client.

The IMS UA registers with the IMS core using credentials stored on the ISIM. It can register multiple IMS public user identities associated with the ISIM in case it has multiple IPTV clients connected. The Home NAT Control Function will interface the IMS Middleware with any router with NAT functionality if placed between the local network and the delivery network. It will open and close ports for the unicast media streams according to the Internet Gateway Device specification defined by UPnP Forum. The GBA Client is the client which handles the key management in the ITF. More information regarding the GBA Client is found in 3GPP TS 33.220: "Generic Authentication Architecture (GAA); Generic bootstrapping architecture".

FIG. 3C illustrates an embodiment of the invention showing how the ANIP of the invention can be used in order for a CEA-2014 enabled client to access IMS services.

Here, the user device 4, typically a TV with an STB, comprises a CEA 2014 remote user interface (UI) client (RUI C) 46 and a media renderer (MR) 48 while the access network node 6''' comprises a CEA 2014 RUI S (Remote UI server) 54. The RUI C 46 is responsible for setting up and maintaining a secure tunnel 9''' to the access network node 6''' over a broadband connection, e.g. DSL, HFC (hybrid fiber-coaxial cable), HSPA, GPRS, WiFi, WiMax etc. The secure tunnel 9''' is, in this embodiment, established by means of a secure SSL (Secure Sockets Layer) or TLS (Transport Layer Security) tunnel 9'''. Thereby the user device 4 with help of the RUI C 46, which can be termed as an enhanced browser application, can communicate directly with the RUI S 54 even if the user device 4 is remote from the first local network 3a, provided that the address 16 or FQDN (Fully Qualified Domain Name) of the RUI S is known to the user device 4.

FIG. 4 illustrates the interfaces between the entities involved in the IMS session according to embodiment C described above with reference to FIG. 3C. It also illustrates the functionality typically located in the RUI S 54. "IF A" is the interface between the RUI C 46 and the RUI S 54 (as defined in CEA-2014), IF B is the interface between the RUI S 54 and the ANIP core 251''' functionality, and IF C is the interface between the ANIP 25''' and the IMS network, e.g. providing SIP communication between the ANIP25''' and the IMS network. IF B is in this case an API.

IF B implements a translation function between ITF IMS functionality provided by the ANIP core 251''' and CEA 2014. Interface B performs session invocation requests to and from the ANIP core 251'''.

An application 59 in FIG. 4 is responsible for performing internal tasks in the server corresponding to notifications received from the event notification handlers. IF B would serve as a source of event notifications from the IMS core. These events could for example be: a call notification event to be displayed on the user device 4 when there is an incoming call to the ANIP 25''' or request for initiating a media session between the RUI S 54 and RUI C 46. CEA-2014 defines the i-box model in the document "CEA-2014 Web-based Protocol and Framework for Remote User Interface on UPnP™ Networks and the Internet (Web4CE)" which supports the remote presentation and control of UIs that reside on a non-discoverable remote server on the Internet. This paves a way for collocating the RUI S with the ANIP core 251''' in the access network 2.

Figure 5A:
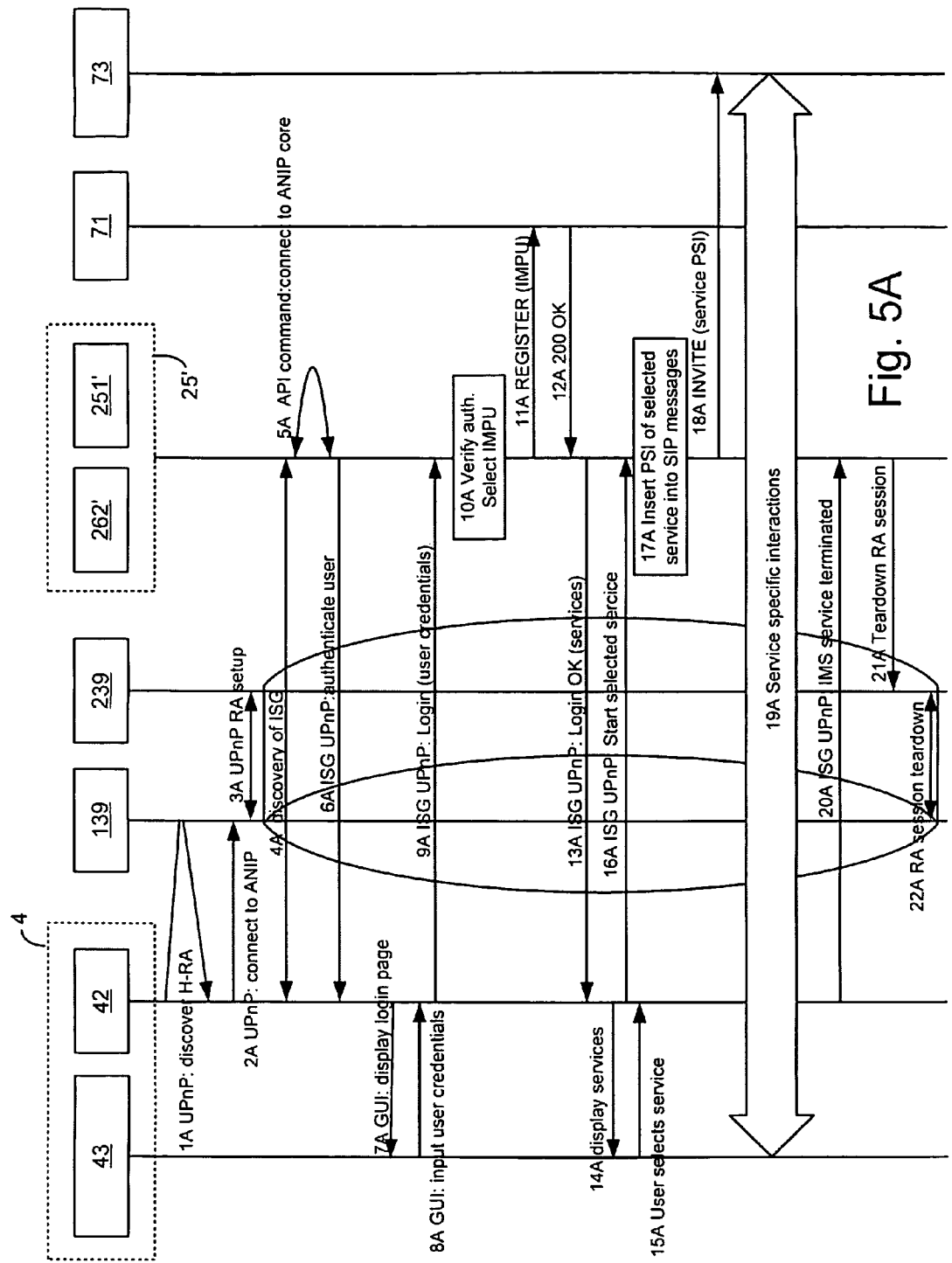
FIGS. 5A-5C are signalling diagrams illustrating the signalling paths between the various entities/functional modules in the different main embodiments of the communications network system shown in FIGS. 3A-3C.
Figure 5B:
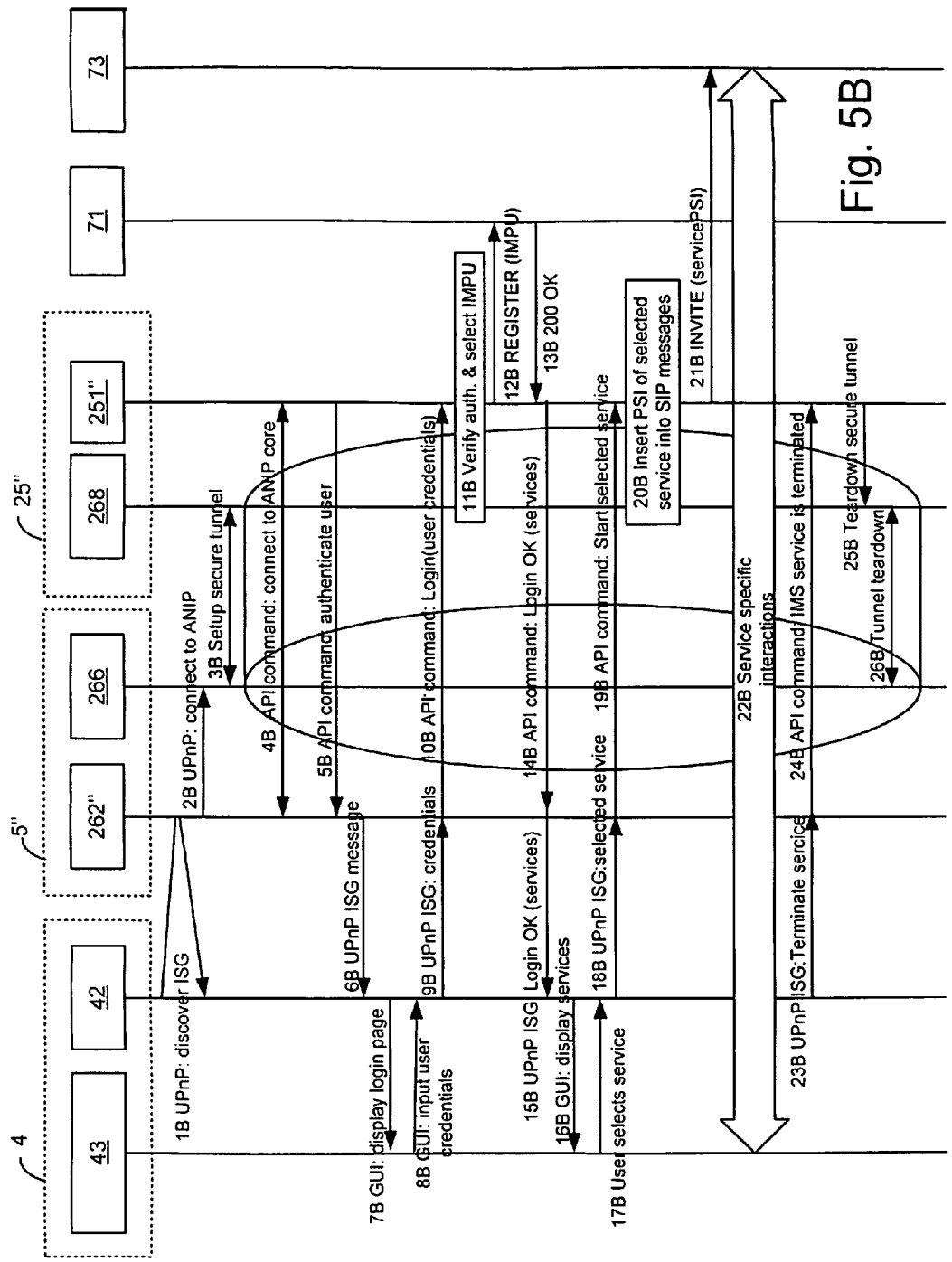
Figure 5C:
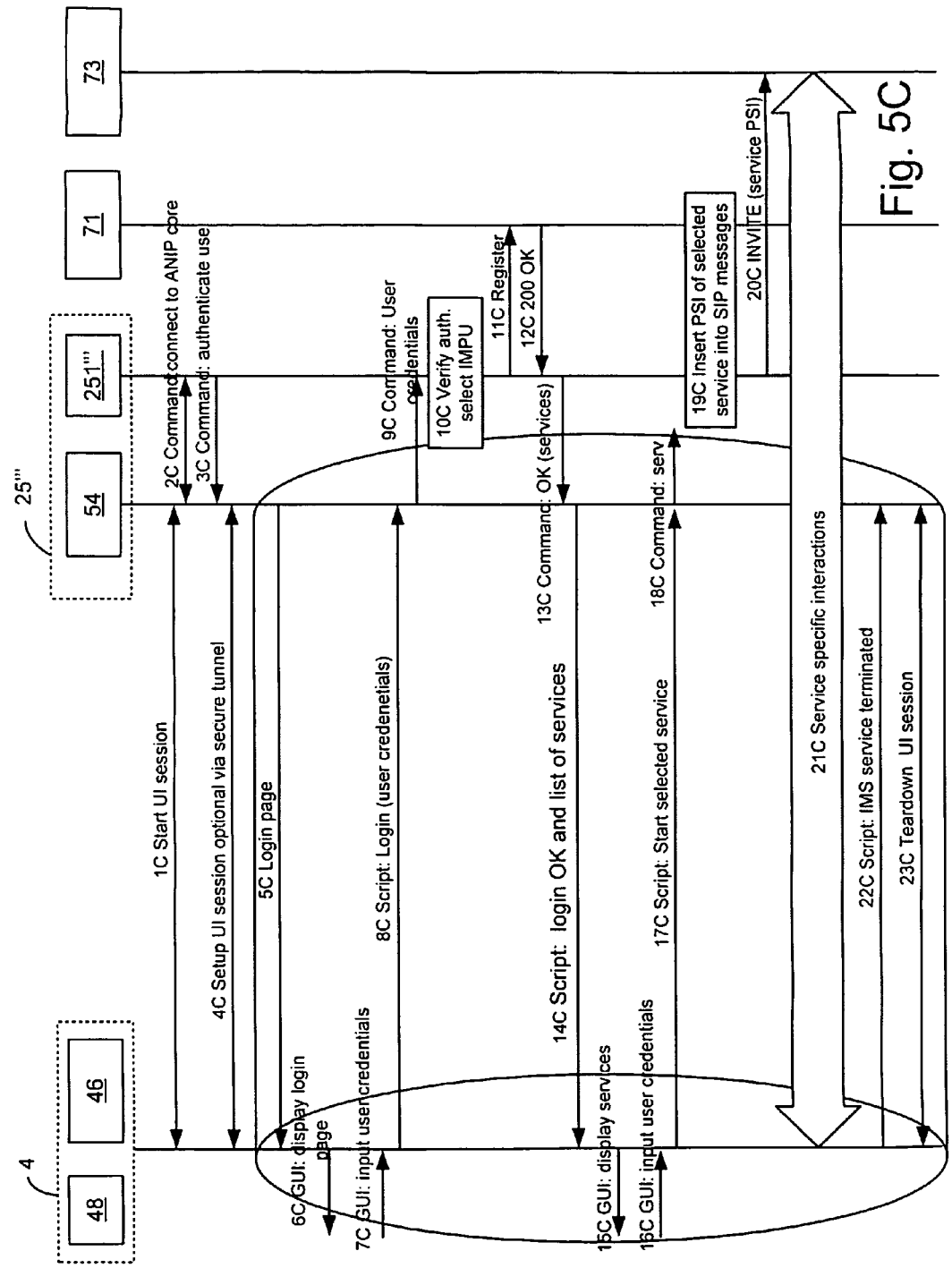

FIGS. 5A-C are signalling diagrams which illustrate the signalling path between the various devices/functional modules in the three embodiments, when a non-IMS enabled user device is accessing IMS services via the ANIP.

FIG. 5A illustrates the signals sent between the various devices/functional modules of the network system described above with reference to FIG. 3A. When describing the signalling diagram in FIG. 5A, reference will therefore simultaneously be made to FIG. 3A.

In this case the ISG CP 42 in the DLNA enabled user device 4 is pre-configured with the IP address of the A-RA 239 of the access network node 6a, i.e. the address 16. In a first step 1A a UPnP request message is transmitted from the ISG CP 42 to discover the H-RA 139 and a respond message is sent back from the H-RA 139.

In a second step 2A a message is sent from the ISG CP 42 to the H-RA 139 comprising a request for connection to the ANIP 25'.

In a third step 3A there is an exchange of UPnP messages between the H-RA 139 and the A-RA 239 setting up the RA connection forming the secure tunnel 9', illustrated as a tunnel in FIG. 5A.

In a fourth step 4A there is an exchange of UPnP messages between the ISG CP 42 and the ANIP 25' for discovering the UPnP ISG 262'.

In a fifth step 5A there is an exchange of API commands between UPnP ISG 262' and the ANIP core 251 which serves to connect the UPnP ISG 262' to the ANIP core 251'.

In a sixth step 6A a request of the ISG UPnP is sent from the ANIP 25' to the ISG CP 42 for user authentication.

In a seventh step 7A a GUI request is sent from the ISG CP 42 to the UPnP MR 43 UI to display a login page on the user device 4.

In an eighth step 8A a GUI message is sent from the UPnP MR 43 to the ISG CP 42 comprising user credentials inputted by the user.

In a ninth step 9A an ISG UPnP login message is sent from the ISG CP 42 to the ANIP 25' comprising the input user credentials.

A tenth step 10A comprises an internal ANIP signalling process in which user authorization is verified based on the received user credentials and an IMPU is selected.

In an eleventh step 11A a SIP registration request sent from the ANIP 25' to the CSCF server 71 of the IMS network comprising the selected IMPU.

In a twelfth step 12A a verification of the registration request is sent from the CSCF server 71 to the ANIP 25' indicating that the identified user (identified by the IMPU) is authorized for IMS service subscription.

A thirteenth step 13A comprises the sending of an ISG UPnP login-OK message from the ANIP 25' to the ISG CP 42 comprising a list of available IMS services.

In a fourteenth step 14A a GUI message is sent from the ISG CP 42 to the UPnP MR 43 for display of available IMS services on the UPnP MR UI of the user device 4.

In a fifteenth step 15A a selected-service message is sent from the UPnP MR 43 to the ISG CP 42 comprising information on what service is requested by the user.

In a sixteenth step 16A an ISG UPnP start-service request is sent from the ISG CP 42 to the ANIP 25' comprising information on what service to start based on the received selected-service message 15A.

A seventeenth step 17A comprises an internal ANIP signalling process in which a PSI (Public Service Identity) of the selected service is inserted into SIP messages.

In an eighteenth step 18A a SIP-invite message is sent from the ANIP 25' to the AS 73 in the form of a SAS (Service Application Server), the invite message comprising the PSI of the requested IMS service and inviting the SAS to start said service.

A nineteenth step 19A indicates service specific interactions between the UPnP MR 43 of the user device 4 and the SAS of the IMS network.

In a twentieth step 20A an ISG UPnP message is sent from the ISG CP 42 to the ANIP 25' indicating that the IMS service is terminated.

In a twenty-first step 21A a RA-teardown message is sent from the ANIP 25' to the A-RA 239 initiating teardown of the RA session between the H-RA 139 and A-RA 239.

A twenty-second step 22A comprises an exchange of teardown-messages between the A-RA 239 in the local network node 5' and the H-RA 139 in the access network node 6' which serves to teardown the secure tunnel 9' and thereby terminating the IMS session.

FIG. 5B illustrates the signals sent between the various devices/functional modules of the network system described above with reference to FIG. 3B. In this case the UPnP ISG 262" in the local network node 5" is pre-configured with the IP address of the ANIP 25" in the access network node 6".

In a first step 1B a UPnP request-respond message is transmitted from the ISG CP 42 to discover the ISG 262".

In a second step 2B a UPnP message is sent from the UPnP ISG 262" to the HTTP application 266 comprising a request for connection to the ANIP 25".

A third step 3B comprises an exchange of messages between the HTTP application 266 of the local network node 5" and the HTTP application 268 of the access network node 6" serving to establish a secure tunnel 9" between the two, which secure tunnel may be e.g. an HTTPs connection.

A fourth step 4B comprises an exchange of API commands between the UPnP ISG 262" and the ANIP core 251" which serves to connect the UPnP ISG 262" to the ANIP core 251'".

In a fifth step 5B an API command is sent from the ANIP core 251" to the UPnP ISG 262" requesting user authentication.

A sixth step 6B comprises sending of a UPnP ISG message from the UPnP ISG 262" to the ISG CP 42 forwarding the request for user authentication to the user device 4.

In a seventh step 7B a GUI request is sent from the ISG CP 42 to the UPnP MR 43 UI to display a login page on the user device 4.

In an eighth step 8B a GUI message is sent from the UPnP MR 43 to the ISG CP 42 comprising user credentials input by the user.

In a ninth step 9B a UPnP ISG message is sent from the ISG CP 42 to the UPnP ISG 262" comprising the input user credentials.

In a tenth step 10B an API command is sent from the UPnP ISG 262" to the ANIP core 251" comprising the user credentials.

An eleventh step 11B comprises an internal ANIP signalling process in which user authorization is verified based on the received user credentials and an IMPU is selected.

A twelfth step 12B comprises a SIP registration request sent from the ANIP to the CSCF server 71 of the IMS network comprising the selected IMPU.

In a thirteenth step 13B a verification of the registration request is sent from the CSCF server 71 to the ANIP core 251" indicating that the identified user, identified by the IMPU, is authorized for IMS service subscription.

In a fourteenth step 14B a login-OK API command message is sent from the ANIP core 251" to the UPnP ISG 262" indicating that the user is authorized for IMS service subscription and comprising a list of available IMS services.

In a fifteenth step 15B a UPnP ISG login-OK message is forwarding the information contained in the login-OK API command message from the UPnP ISG 262" to the ISG CP 42.

In a sixteenth step 16B a GUI request message is sent from the ISG CP 42 to the UPnP MR 43 for display of available IMS services on the UPnP MR UI of the user device 4.

In a seventeenth step 17B a selected-service message from the UPnP MR 43 is sent to the ISG CP 42 comprising information on what service is requested by the user.

In an eighteenth step 18B an UPnP ISG start-service request is sent from the ISG CP 42 to the UPnP ISG 262" comprising information on what service to start based on the received selected-service message of the seventeenth step 15A.

In a nineteenth step 19B an API command is sent from the UPnP ISG 262" to the ANIP core 251" comprising information on what service was chosen by the user and a request to start said service.

A twentieth step 20B comprises an internal ANIP signalling process in which the PSI of the selected service is inserted into SIP messages.

In a twenty-first step 21B a SIP-invite message is sent from the ANIP core 251" to the AS 73, here in the form of a SAS, comprising the PSI of the requested IMS service and inviting the SAS to start said service.

A twenty-second step 22B comprises service specific interactions between the user interface of the UPnP MR 43 in the user device 4 and the SAS of the IMS network.

In a twenty-third step 23B a UPnP ISG message is sent from the ISG CP 42 to the ISG 262" indicating that the IMS service should be terminated.

In a twenty-fourth step 24B an API command is sent from the ISG 262" to the ANIP core 251" forwarding the information that the IMS service is terminated.

In a twenty-fifth step 25B a teardown message is sent from the ANIP core 251" to the HTTP application 268 on the access network side initiating teardown of the secure HTTP connection.

A twenty-sixth step 26B comprises an exchange of teardown-messages between the HTTP application 268 residing in the ANIP 25" of the access network node 6" and the HTTP application 266 residing in the local network node 5" which serves to teardown the secure tunnel 9" and thereby terminating the IMS session.

FIG. 5C illustrates the signals sent between the various devices/functional modules of the network system described above with reference to FIG. 3C. However, in FIG. 5C there is only one illustrated line for the communication with other nodes, since RUI C 46 is the main concern in this illustration in comparison with the MR 48.

In this case the RUI C 46 in the user device 4 is preconfigured with the IP address of the RUI S 54 in the ANIP 25'''.

A first step 1C comprises a start message sent from the RUI C 46 to the RUI S 54 comprising a request for starting a UI session.

A second step 2C comprises an exchange of commands between the RUI S 54 and the ANIP core 251''' which serves to connect the RUI S to the ANIP core 251'''.

A third step 3C comprises a command from the ANIP core 251''' to the RUI S 54 requesting user authentication.

A fourth step 4C comprises an exchange of messages between the RUI C 46 of the user device 4 and the RUI S 54 of the ANIP 25''' in the access network node 6''' serving to establish the secure tunnel 9''' between the RUI C 46 and RUI 54, which secure tunnel may be set up using SSL or TLS and hence form e.g. a HTTPs connection.

A fifth step 5C is a user authentication request from the RUI S 54 to the RUI C 46 telling it to effect display of a login page on the GUI of the user device 4.

In a sixth step 6C a GUI request is sent from the RUI C 46 to the MR 48 UI for display of a login page on the user device 4.

In a seventh step 7C is a GUI message from the MR 48 to the RUI C 46 comprising user credentials input by the user.

An eighth step 8C comprises a login-script message sent from the RUI C 46 to the RUI S 54 comprising the input user credentials and a request for executing a login-script on the RUI S 54.

In a ninth step 9C a user-authorization command is sent from the RUI S 54 to the ANIP core 251''' comprising the user credentials.

A tenth step 10C comprises an internal ANIP signalling process in which user authorization is verified based on the received user credentials and an IMPU is selected.

In an eleventh step 11C a SIP registration request is sent from the ANIP to the CSCF server 71 of the IMS network.

In a twelfth step 12C a verification of the registration request is sent from the CSCF server 71 to the ANIP core 251''' indicating that the identified user is authorized for IMS service subscription.

In a thirteenth step 14C a login-OK command message is sent from the ANIP core 251''' to the RUI S 54 indicating that the user is authorized for IMS service subscription and comprising a list of available IMS services.

In a fourteenth step 14C a service scrip message is sent from the RUI S 54 to the RUI C 46 notifying the RUI C 46 that login is OK and comprising a list of available IMS services.

In a fifteenth step 15C a GUI request message is sent from the RUI C 46 to the MR 48 for display of available IMS services on the MR UI of the user device 4.

In a sixteenth step 16C a selected-service message is sent from the MR 48 to the RUI C 46 comprising information on what service is requested by the user.

In a seventeenth step 17C start-service script message is sent from the RUI C 46 to the RUI S 54 comprising information on what service to start based on the received selected-service message of the sixteenth step 16C.

In an eighteenth step 18C a command is sent from the RUI S 54 to the ANIP core 251''' comprising information on what service was chosen by the user and a request to start said service.

A nineteenth step 19C comprises an internal ANIP signalling process in which the PSI of the selected service is inserted into SIP messages.

In a twentieth step 20C a SIP invite-message is sent from the ANIP core 251''' to the AS 73 in the form of a SAS comprising the PSI of the requested IMS service and inviting the SAS to start said service.

A twenty-first step 21C indicates service specific interactions between the user interface of the MR 48 in the user device 4 and the SAS of the IMS network.

In a twenty-second step 22C a service-terminated script message is sent from the RUI C 46 to the RUI S 54 indicating that the IMS service is terminated.

A twenty-third step 23C comprises an exchange of tear-down-messages between the RUI C 46 in the user device 4 and the RUI S in the ANIP 25''' of the access network node 6''' which serves to teardown the secure tunnel 9''' and thereby terminating the IMS session.

With reference to FIG. 6 and FIGS. 5A-5C, a method for the ANIP 25 for providing a non-IMS enabled user device access to IMS services via ANIP functionality in an access network node will be described. In a first step S1, the ANIP receives a connection request from a non-IMS enabled user device 4, e.g. in the first local network 3a. This step is performed in the respective embodiments A, B and C by transmission and reception of the signals of the steps 1A-2A, 1B-2B and 1C-2C illustrated in FIGS. 5A-5C.

In a second step, a secure tunnel is set up between the ANIP 25 and the local network node 5a or directly between the ANIP 25 and the user device 4 (Embodiment C). This step correspond to step 3A in FIG. 5A, step 3B in FIG. 5B, step 4C in FIG. 5C. Depending on the network system design, the communication between the ANIP and the user device 4 may be direct communication (embodiment C), pass via a UPnP ISG and two UPnP remote access agents (A-RA, H-RA) (embodiment A), or pass via two HTTPs clients and an ISG (embodiment B).

In a third step S3, the ANIP 25 performs user authentication, This step is performed in the respective embodiments A, B and C by transmission and reception of the signals 6A-10A, 5B-11B and 3C-10C illustrated in FIGS. 5A-5C. The signalling diagrams in FIGS. 5A-5C all illustrates the alternative in which the user has to input user credentials which, in some of the ways mentioned above when describing the optional user identification means 254 with reference to FIG. 3, are verified by the ANIP 25. However, it should be appreciated that there are many other ways than the one illustrated in FIGS. 5A-5C in which a user or user device can be authorized to gain access to the ANIP 25. For example, the user device may comprise a user device identity and be arranged to attach user device credentials to the message with which it initiates the entire IMS session, whereupon the ANIP 25 can be arranged to determine whether the user device is authorized for ANIP access based on the attached user device credentials.

If the user/user device is authorized by the ANIP 25, the ANIP 25 proceeds with a fourth step S4, in which a public identity in the form of an IMPU is selected for the user and transmitted to the CSCF server 71 of the IMS network for registration. If the user/user device is found to be unauthorized by the ANIP 25, access to the ANIP 25, and thus to services via the IMS network, is denied by the ANIP. This step corresponds to step 11A of FIG. 5A, step 12B of FIG. 5B and step 11C of FIG. 5C.

Nodes in the IMS network determine whether the user is authorized for IMS subscription based on the received IMPU from the ANIP 25. This is as such known to a person skilled in the art and therefore not described in detail. If the user/user device is authenticated the ANIP 25, in a fifth step S5, receives a confirmation message, typically a "200 OK" message from the CSCF. This step corresponds to step 12A in FIG. 5A, step 13B in FIGS. 5B and 12C in FIG. 5C.

When the user has been accepted for at least one IMS service the ANIP 25 sends a message, in a sixth step S6, to the user device 4 that the user has successfully logged in and is authorized to use the IMS service or services. This corresponds to step 13A in FIG. 5A, 14B in FIG. 5B and 13C-14C in FIG. 5C.

In a seventh step S7 the ANIP 25 receives a request message to start an IMS enabled service that has been selected by the user based on the information sent by the ANIP in the sixth step S6. This step corresponds to steps 15A-16A in FIG. 5A, 17B-19B in FIG. 5B, and steps 16-18C in FIG. 5C.

In an eighth step S8 a service session initiation message is sent from the ANIP 25 to the AS 73. The service session initiation message is here in the form of a SIP INVITE message comprising the PSI of the requested service and inviting the AS 73 to start service communication with the user device 4. This step corresponds to steps 17A-18A of FIG. 5A, 20B-21B of FIGS. 5B and 19C-20C of FIG. 5C.

Throughout this document, three different main embodiments of a communications network 1 have been described, each utilizing various communication techniques for connecting the user device 4, 41 to the access network 2. We have seen that the functionality residing in the user devices, the home/local network and the access network, respectively, differs in parts between the different embodiments. However, in all embodiments, an access network node 6, 6', 6", 6''' comprises means, such as the access network tunnel termination point 21, for receiving non-SIP data over a secure tunnel/ connection 9, 9', 9", 9''', and ANIP core 251 functionality comprising protocol translation means 252 for translating said data so that it conforms to the SIP protocol before transmitting it to an IMS network. Thereby, all the embodiments of the inventive ANIP network architecture described herein have in common that the ANIP functionality allowing non-IMS enabled user devices 4, 41 to access SIP based IMS services resides in the access network. Thereby the need for incorporating all IMS-enabling functionality in the user devices or nodes in the user's private local network is eliminated.

The invention claimed is:

1. A method for an access network node to provide a user device access to a service enabled by an IMS network, comprising the steps of:
   setting up an IP tunnel for communication with the user device, wherein setting up the IP tunnel further comprises setting up the IP tunnel between the access network node and a local network node to which the access network node and user device are connected, and
   the IP tunnel is a Virtual Private Network tunnel established between a first Universal Plug and Play Remote Access agent in the access network node and a second Universal Plug and Play Remote Access agent in the local network node,
   sending an authentication request to the user device via the IP tunnel,
   receiving a response to the authentication request from the user device via the IP tunnel,
   authenticating the user device for communication with the access network node based on the response,
   sending a registration request comprising an IP Multimedia Public Identity associated with the user device to an IMS network node for registration of the user device in the IM1 network,
receiving a confirmation message from the IMS network node that the user device is authenticated for the service,
   sending an authorization confirmation message via the IP tunnel to the user device that the user device is authorized for the service,
   receiving a service request via the IP tunnel from the user device to start the service,
   sending a service session initiation message to an application server associated with the service, wherein the service initiation message starts a service session between the user device and the application server.

2. The method according to claim 1, wherein the authentication request, the response, the authorization confirmation message and the service request are sent as Application Programming Interface calls.

3. The method according to claim 1, comprising the step of setting up the IP tunnel directly between the access network node and the user device.

4. The method according to claim 1, comprising the steps of:
   receiving the service request in the form of a UPnP message and translating the UPnP message to a Session Initiation Protocol message.

5. An access network node for providing a user device access to a service enabled by an IMS network, comprising:
   a first communications interface for communication with the user device,
   a second communications interface for communication with an IMS network node,
   a tunnel client for setting up an IP tunnel for communication with the user device, wherein
      setting up the IP tunnel further comprises setting up the IP tunnel between the access network node and a local network node to which the access network node and user device are connected, and
      the IP tunnel is a Virtual Private Network tunnel established between a first Universal Plug and Play Remote access agent in the access network node and a second Universal Plug and Play Remote access agent in the local network node, and user identification means which enables the access network to:
   send an authentication request to the user device via the IP tunnel,
   receive a response to the authentication request from the user device via the IP tunnel,
   authenticate the user device for communication with the access network node based on the response,
   send a registration request comprising an IP Multimedia Public Identity associated with the user device to an IMS network node for registration of the user device in the IMS network,
   receive a confirmation message from the IMS network node that the user device is authenticated for the service,
   sending an authorization confirmation message via the IP tunnel to the user device that the user device is authorized for the service,
   receive a service request via the IP tunnel from the user device to start the service,
   send a service session initiation message to an application server associated with the service, wherein the service initiation message to starts a service session between the user device and the application server.

6. The access network node according to claim 5, wherein the tunnel client is adapted to set up the IP tunnel in such a way that it terminates in a first end in the access network node and in a second end in the user device.

7. The access network node according to claim 5, wherein the tunnel client is adapted to set up a Hypertext Transfer Protocol over Secure Socket Layer tunnel.

8. The access network node according to claim 5, comprising a protocol translation means for translating a message from the user device into a Session Initiation Protocol message to the IMS network node.

9. The access network node according to claim 8, wherein the message from the user device is a UPnP message.

10. The access network node according to claim 5, wherein the user identification means comprises at least one software IP Multimedia Services Identity Module.

* * * * *